Nov. 16, 1937.   J. M. GRUYER   2,099,477
CHANGE SPEED CHAIN GEARING FOR BICYCLES AND THE LIKE
Filed Oct. 20, 1936   3 Sheets-Sheet 1
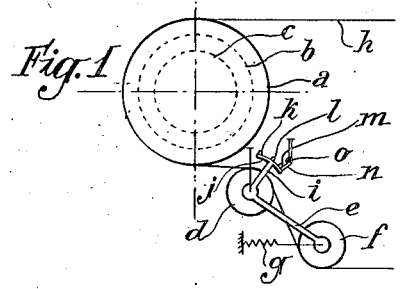
Fig. 1
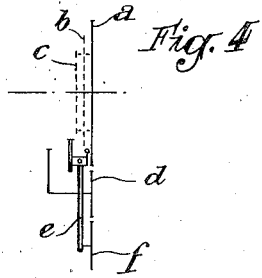
Fig. 4
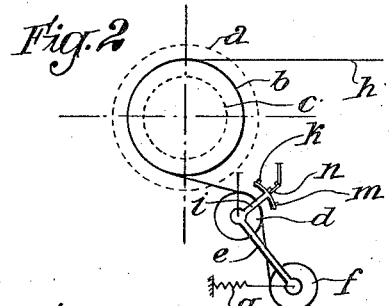
Fig. 2
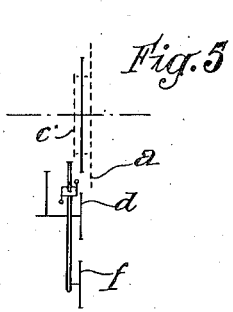
Fig. 5
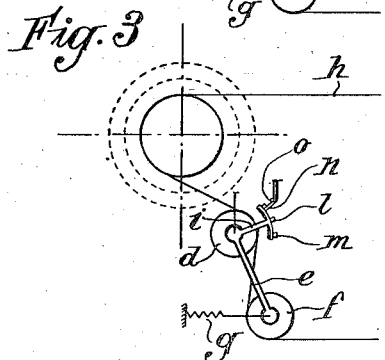
Fig. 3
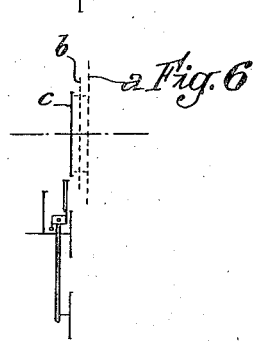
Fig. 6
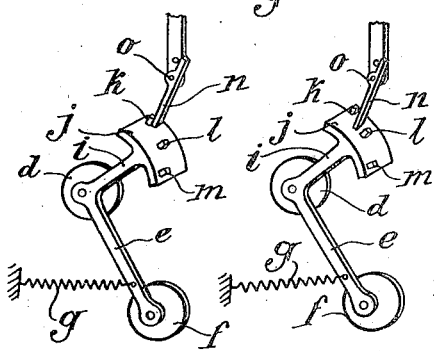
Fig. 7   Fig. 8   Fig. 9
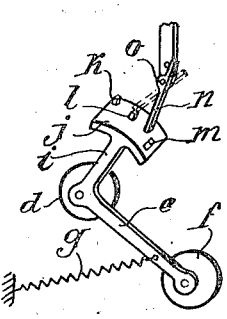
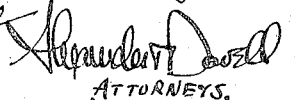
INVENTOR:
Jean Marcel Gruyer
by
ATTORNEYS.

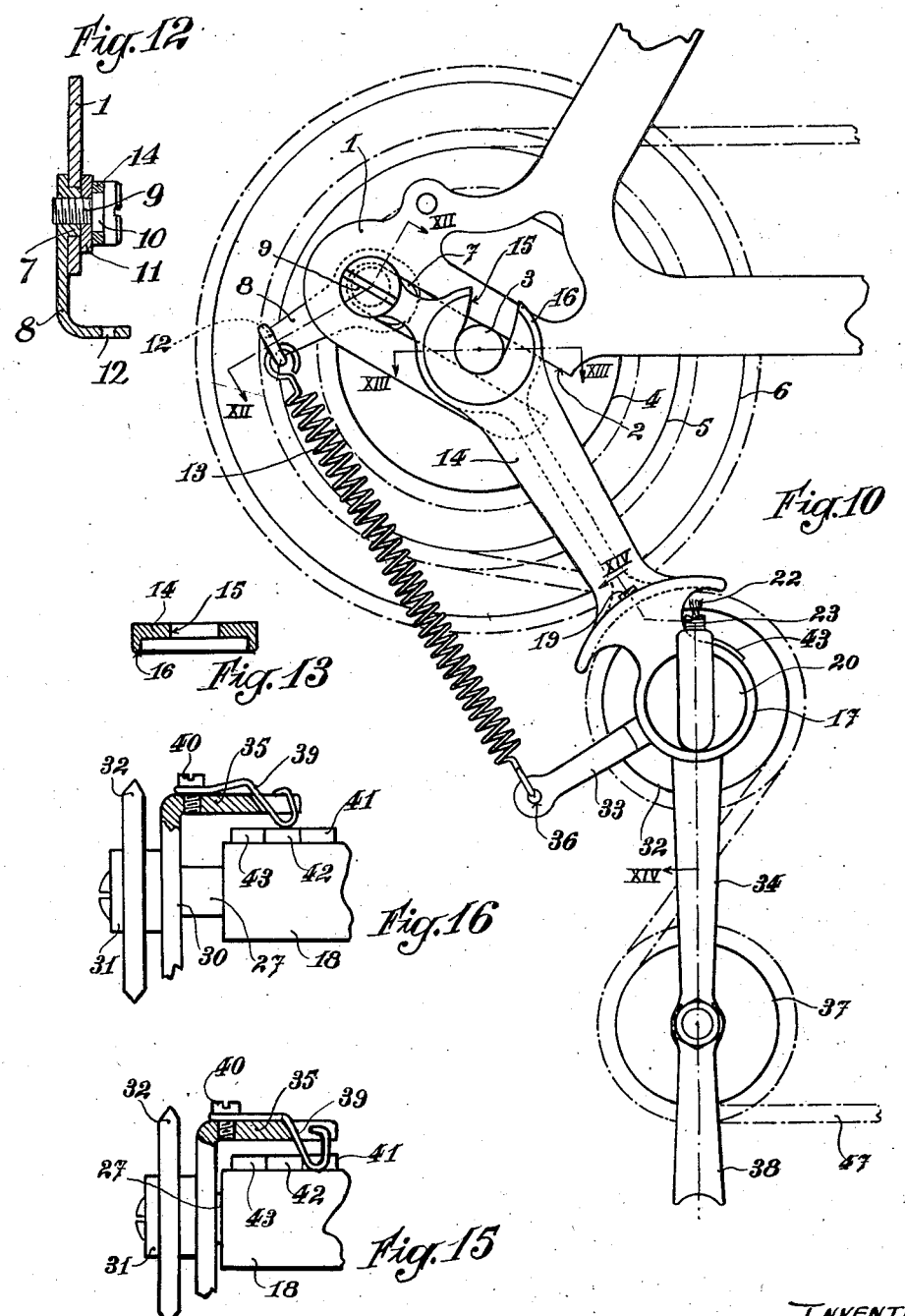

Nov. 16, 1937.  J. M. GRUYER  2,099,477
CHANGE SPEED CHAIN GEARING FOR BICYCLES AND THE LIKE
Filed Oct. 20, 1936  3 Sheets-Sheet 3
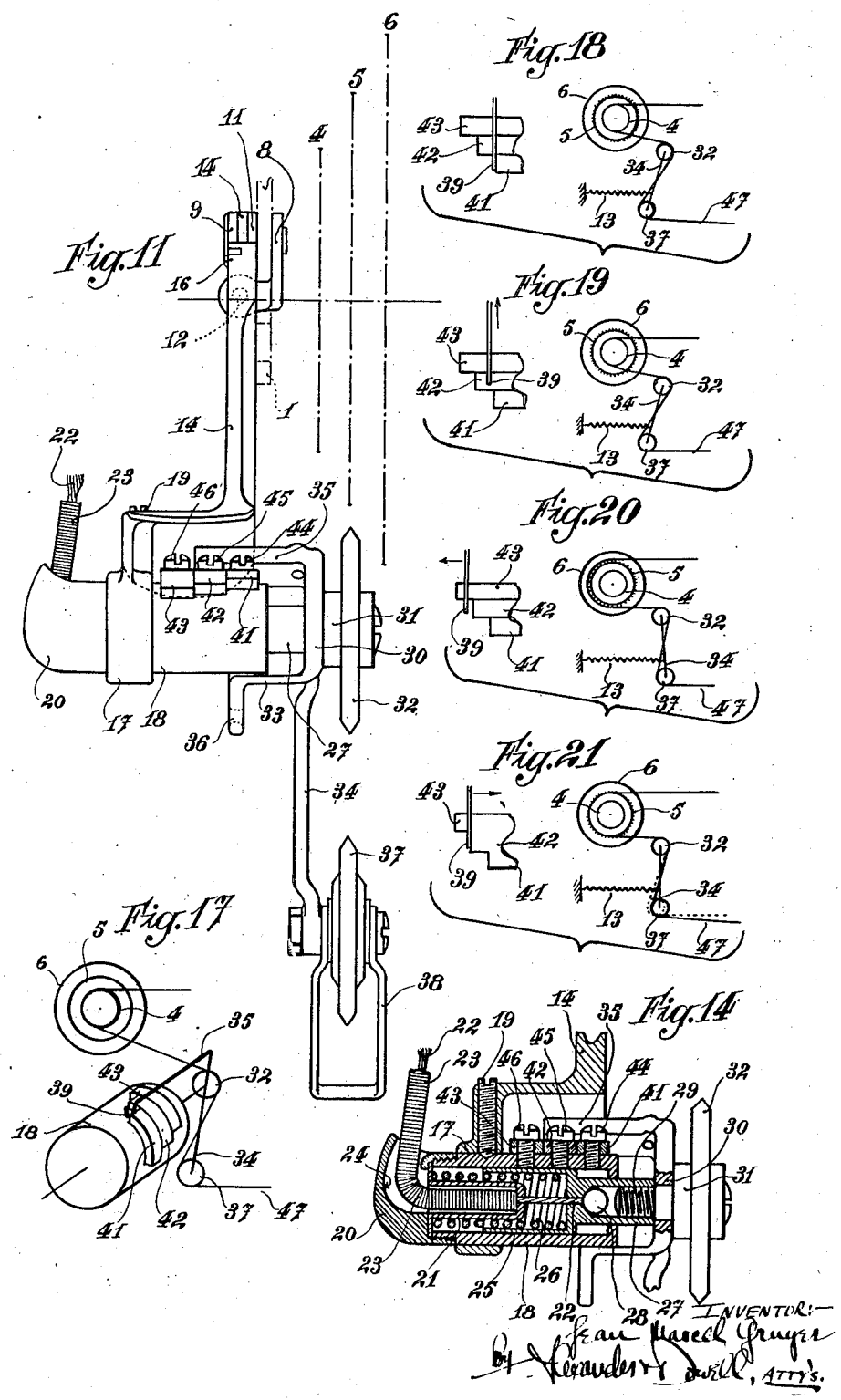

Patented Nov. 16, 1937

2,099,477

UNITED STATES PATENT OFFICE 2,099,477

CHANGE SPEED CHAIN GEARING FOR BICYCLES AND THE LIKE

Jean Marcel Gruyer, Lyon, France, assignor to Victor Simon, Lyon, France

Application October 20, 1936, Serial No. 106,658
In France November 5, 1935

10 Claims. (Cl. 74—217)

This invention relates to change speed chain gearings for bicycles of the type in which the axial displacement of the chain is obtained by displacing a movable guide pinion on which the chain is passed in front of the selected driving sprocket of the rear wheel, while the chain is stretched by a tensioning roller or sprocket.

In the known apparatus of this kind the tensioning roller is carried by a spring-loaded lever and the tension spring acts constantly on the chain which is thus overstretched. This produces a resistance for the rider of the cycle.

According to the present invention this drawback is avoided by providing a series of limiting abutments, supported by the tensioning lever or by the fixed parts, these abutments selectively cooperating with another abutment or detent respectively supported by the fixed parts or by the tensioning lever, in such a manner that for each axial position of the said tensioning lever corresponding to a given speed, the said last-named abutment or detent cooperates with a corresponding limiting abutment so adjusted that the tensioning movement of the lever under the action of the tension spring is limited to the desired value.

On the other hand, since in change speed chain gearings the axial displacement of the guide pinion together with the tensioning lever is effected before the chain passes from a sprocket to the next one, the limiting abutments or the cooperating detent or both are so arranged that they only come into operative position after the chain has been overstretched due to its passage over two sprockets at the same time and to its riding on the tips of the sprocket teeth.

Further objects of this invention will become obvious from the following description.

In the annexed drawings:

Fig. 1 is a diagrammatical side view of a first embodiment of this invention, the gearing being at the lowest speed.

Figs. 2 and 3 are views similar to Fig. 1, the gearing being respectively at the second and top speed.

Figs. 4 to 6 are diagrammatical end views respectively corresponding to Figs. 1 to 3.

Fig. 7 is a diagrammatical perspective view showing the essential parts of the gearing at the top speed.

Fig. 8 is a view similar to Fig. 7, but when the guide pinion has just been displaced for changing from top speed to second speed.

Fig. 9 shows the position of the parts when the chain is overstretched due to its riding on the tips of the teeth.

Fig. 10 is a general side view of another embodiment of the invention.

Fig. 11 is the corresponding end view.

Figs. 12, 13 and 14 are partial sections taken on lines XII—XII, XIII—XIII, and XIV—XIV of Fig. 10.

Figs. 15 and 16 are detail views with partial section respectively showing the abutments and detent at the top speed and when the guide pinion has just been displaced for changing from top speed to second speed.

Fig. 17 is a diagrammatical perspective view showing the position of the essential parts at the top speed.

Figs. 18 to 21 are diagrams illustrating the passage from top speed to second speed.

The device diagrammatically illustrated in Figs. 1 to 9 comprises as usual three sprockets $a$, $b$, $c$ on the rear wheel of the bicycle, a guide pinion $d$ able to be axially displaced by appropriate control means not shown, and a tensioning lever $e$ pivoted about the axis of the guide pinion $d$ and submitted to the action of a tension spring $g$, the said lever carrying the tensioning pinion or roller $f$ for the driving chain $h$.

The tensioning lever $e$ carries an arm $i$ supporting an arcuate plate $j$ provided with three spaced abutments $k$, $l$, $m$ disposed along an oblique line. A detent or finger $n$ is hinged to the frame or support at $o$, such finger being prevented from rotating anticlockwise beyond its normal position shown in Figs. 1 to 3, by any appropriate stop. The diagrams of Figs. 7 to 9, given only for the sake of clearness, clearly show the role of finger $n$ which in cooperation with an abutment such as $k$ limits the clockwise motion of lever $e$ under the action of spring $g$.

For each speed the guide pinion $d$ together with lever $e$, arm $i$ and plate $j$, assume a given axial position, controlled by any means such as a cable as in the known apparatus; and for each such axial position there is an abutment $k$, $l$ or $m$ cooperating with finger $n$. It will be at once understood that, if abutments $k$, $l$, $m$ are appropriately disposed on plate $j$, spring $g$ will be prevented from overstretching the chain $h$ for any speed. Figs. 1 to 3 and 4 to 6 clearly illustrate the different positions of the parts for the three speeds. It will easily be grasped that the improved gearing would also work for any other number of speeds: two, four or more.

When passing from a speed to the next one the guide pinion is first axially displaced and thereafter the chain passes from a sprocket to the next one. When passing from a low speed to a higher one (i. e. from a large sprocket to a smaller one) this is without inconvenience since the tensioning lever e will tend to rotate clockwise when the chain is passed over the new sprocket. But when passing from a high speed to a lower one (i. e. from a small sprocket to a larger one) the tensioning lever e will tend to rotate anticlockwise and the abutment corresponding to the lower speed will strike the back of finger n and not the front face thereof. However, owing to the overstretching of the chain which results from the passage thereof over two sprockets at the same time and on the tips of the sprocket teeth, and also to the pivoted arrangement of finger n, this is not a hindrance.

To make the matter clear let us suppose that the gearing is in top speed (Figs. 3, 6 and 7) finger n being engaged by abutment k; the chain is over sprocket c. The rider shifts the controlling lever or handle to second speed, which causes the guide pinion d and associated parts to be axially displaced through a given distance; the chain does not leave at once sprocket c to jump over sprocket b; this passage is progressive and therefore the parts assume a position such as Fig. 8 in which finger n is in line with the abutment l corresponding to the second speed, but at a distance thereof in an anticlockwise direction along plate j and with respect to the axis of the guide pinion d. When the chain leaves sprocket c and passes over sprocket b there is an instant during which the chain rides over the two sprockets at the same time and in part over the tips of the teeth thereof. This causes a marked overstretching of the chain and the tensioning lever e is therefore moved anticlockwise against the action of spring g for a considerable angle (Fig. 9). Finger n is therefore rotated by abutment l striking its back, as shown in dotted lines; it escapes abutment l and resumes its normal position. When the chain rides correctly over sprocket b, it slackens and lever e rotates clockwise under the action of spring g. This tensioning motion is limited by abutment l which strikes the front face of finger n (Figs. 2 and 5). Thus owing to the pivoted arrangement of finger n the rider has only to shift his controlling lever or handle without having to actuate the same progressively so as not to reach the second-speed position of the controlling lever or handle before the chain has left the top speed sprocket.

Figs. 10 to 21 illustrate another embodiment of this invention comprising certain improvements in connection with the main object thereof.

Referring to Fig. 10 the lug 1 of the bicycle frame has the usual slot 2 for the fixed axle 3 of the rear wheel (not illustrated) the hub of which carries the stepped sprockets 4, 5 and 6. An elongated projection 7 (Figs. 10 and 12) fits in the bottom of slot 2, this projection being formed on an arm 8 situated behind lug 1 and fixed by means of a screw 9 having a shoulder 10 pressing against a washer 11. The turned-up end of arm 8 has a hole 12 receiving one end of the tension spring 13.

On shoulder 10 there is loosely mounted the end of an arm 14 forming a support for the gearing and this arm is formed with an arcuate groove 15 concentric with screw 9, such groove being adapted to receive the axle 3 which, when in the bottom of groove 15, is concentric with a raised edge 16 forming a cup for receiving the usual washers and the nut which locks the rear wheel within the frame. It will be easily understood that these washers also lock arm 14 with respect to axle 3.

Arm 14 terminates into a ring-like member 17 which receives a cylindrical drum 18 (Figs. 11 and 14) locked at the desired position by means of a set screw 19. Cylinder 18 is provided with a threaded head or cover 20 which clamps the turned edge of a socket 21 having its bottom pierced for the passage of the controlling cable 22. The sheath 23 of the latter is retained within socket 21 as clearly shown in Fig. 14. The head 20 is provided with a bent passage 24 which guides and protects sheath 23.

A hollow piston 25 is slidable within cylinder 18 and submitted to the action of a compression spring 26 exterior to socket 21 and interior to piston 25. This spring is thus perfectly guided.

Piston 25 carries a hollow rod 27 projecting from cylinder 18 and cable 22 terminates within said rod and is provided with an end member 28 forming an abutment against the partition which separates the bore of rod 27 from the bore of piston 25.

Rod 27 is threaded internally to receive a screw 29 which clamps the hub 30 of the tensioning lever and the ball bearing 31 of the guide pinion 32.

The tensioning lever is formed with three arms 33, 34 and 35. Arm 33 has a hole 36 receiving the end of the tension spring 13; arm 34 carries the tensioning roller 37 with the usual chain guide 38; and arm 35 is bent over cylinder 18 and carries a depressable detent 39 (Figs. 15–16) made of a steel wire forming a sort of triangular ratchet tooth the plane of which is substantially axial with respect to cylinder 18, the non-oblique part being directed in the direction in which the diameters of the successive sprockets 4, 5 and 6 increase, i. e. in the example illustrated, toward the rear wheel.

Cylinder 18 carries three abutments 41, 42 and 43 in the form of sectors in contact with each other and having their ends staggered as shown in Figs. 11, 14 and 17. These abutments are fixed by means of screws 44, 45 and 46. Preferably one abutment is immovable while the others are adjustable, an elongated opening being provided for the corresponding fixing screw.

Detent 39 abuts against one of these abutments under the action of spring 13, as clearly shown in Figs. 15 and 17, for each speed. And if the gearing is appropriately adjusted, the chain 47 is stretched to the required degree for any one of the three speeds.

When passing from a low speed to a higher one (i. e. from a large sprocket to a smaller one) no difficulty is encountered, as in the case of Figs. 1 to 9. When passing from a high speed to a lower one, e. g. from top speed to second speed, the guide pinion 32 is displaced towards the right of Figs. 11 and 14. Detent 39 which was abutting against abutment 41 (Figs. 15, 17 and 18) is depressed and passes on abutment 42 owing to its oblique edge (Figs. 16 and 19). The chain then passes from sprocket 4 onto sprocket 5 and, for an instant, rides over the tips of the teeth, as diagrammatically shown in Fig. 20. This causes a marked overstretching and the tensioning arm 34 is therefore rotated against the action of spring 13. Due to this rotation (anticlockwise with respect to Fig. 17) detent 39 comes in front of abutment 42 and resumes its normal position. When the driving chain is correctly passed over sprocket 5, the overstretching ceases and arm 34 is returned by spring 13. If there were no abutment, the chain would be submitted to the full tension resulting from spring 13; but owing to the detent 39 and to abutment 42, the clockwise motion of arm 34 is stopped and the chain is only stretched to the desired degree, even if spring 13 is very strong.

To remove the rear wheel it is only necessary to unscrew its usual locking nuts and to pivot arm 14 about screw 9 (Fig. 10). It will be noted that since arm 8 does not follow arm 14, spring 13 is more or less released during this rotation which greatly facilitates the operator.

I claim:

1. A change speed chain gearing for bicycles and the like having a driving chain adapted to selectively drive a plurality of drive sprockets of different diameters, comprising a support fixed to the cycle; an axially movable chain guide pinion carried by said support and adapted to be disposed opposite each of said drive sprockets; a pivoted chain tensioning lever carried by said support and axially movable with said guide pinion; spring means tending to rotate said lever to stretch the driving chain of the cycle; and cooperating abutments on said support and on said chain tensioning lever adapted to limit the tensioning motion of said lever under the action of said spring means for each axial position of said guide pinion.

2. A change speed chain gearing for bicycles and the like having a driving chain adapted to selectively drive a plurality of drive sprockets of different diameters, comprising a support fixed to the cycle; an axially movable chain guide pinion carried by said support and adapted to be disposed opposite each of said drive sprockets; a pivoted chain tensioning lever carried by said support and axially movable with said guide pinion; spring means tending to rotate said lever to stretch the driving chain of the cycle; and abutments and a depressible detent in mutual cooperation, so arranged on said support and on said chain tensioning lever as to limit the tensioning motion of said lever under the action of said spring means for each axial position of said guide pinion while permitting said guide pinion to be directly brought to its final position before the chain has left one sprocket for a smaller one.

3. In a change speed chain gearing as claimed in claim 2, said abutments being in the form of short projections and said depressible detent comprising a pivoted finger permitting the passage of the corresponding abutment in the direction of rotation of said chain tensioning lever opposed to the action of said spring means, while opposing such passage in the other direction of rotation of said chain tensioning lever.

4. In a change speed chain gearing as claimed in claim 2, said abutments being in the form of cylindrical sectors disposed in mutual contact side by side and in staggered relation, and said depressible detent being in the form of a spring-supported triangular tooth located in a plane axial with respect to the pivot of said tensioning lever and having its oblique edge directed toward the abutment which extends farthest in the direction of rotation of said tensioning lever under the action of said spring means.

5. A change speed chain gearing for bicycles and the like comprising a supporting arm fixed to the cycle; a cylinder carried by said arm, the axis of said cylinder being parallel to the axis of the rear wheel of the cycle; a piston slidable in said cylinder; a rod on said piston; a chain guide pinion at the end of said rod; a chain tensioning lever also carried by said rod; a compression spring within said cylinder to urge said piston toward the rear wheel of the cycle; a controlling cable attached to said piston; a head at the end of said cylinder opposed to said rod, said head being provided with a bent passage opening in the center of its inner face and leading to its periphery; a sheath for said cable, said sheath being guided by said bent passage through which it is passed; means within said cylinder forming abutment for the end of said sheath; and spring means tending to rotate said chain tensioning lever to stretch the driving chain of the cycle.

6. A change speed chain gearing for bicycles and the like comprising a supporting arm fixed to the cycle; a cylinder carried by said arm, the axis of said cylinder being parallel to the axis of the rear wheel of the cycle; a hollow piston slidable in said cylinder, said piston having an end bottom; a rod on the end bottom of said piston externally to the same; a chain guide pinion at the end of said rod; a chain tensioning lever also carried by said rod; a compression spring within said cylinder to urge said piston toward the rear wheel of the cycle, said spring penetrating through the bore of said piston to act on the end bottom of the same; a head externally screwed at the end of said cylinder opposed to said rod, said head being provided with a bent passage opening in the center of its inner face and leading to its periphery; a socket with a turned rim engaged between the end of said cylinder and said head and clamped thereby, said socket being directed toward said piston and forming internal guide for said compression spring; a controlling cable attached to said piston and passing through the bottom of said socket; a sheath for said cable, said sheath being guided by said bent passage and having its end abutting against the bottom of said socket; and spring means tending to rotate said chain tensioning lever to stretch the driving chain of the cycle.

7. A change speed chain gearing for bicycles and the like comprising a supporting arm having an arcuate groove opening laterally thereof for housing the rear wheel axle; a pivot fixed on the cycle frame for said supporting arm concentrically with said arcuate groove; an axially movable chain guide pinion carried by said supporting arm; means to control the axial position of said guide pinion; a pivoted chain tensioning lever carried by said supporting arm and axially movable with said guide pinion; and spring means tending to rotate said chain tensioning lever to stretch the driving chain of the cycle.

8. In a change speed chain gearing as claimed in claim 7, said supporting arm having a projecting ridge surrounding the end of said arcuate groove to form a cup housing the washers and nuts of the rear wheel axle.

9. In a change speed chain gearing as claimed in claim 7, said pivot fixed on the cycle frame comprising a shouldered screw engaged through the axle slot of the rear lug of the cycle frame; and a member having an elongated projection fitting into said axle slot and forming nut for said screw, said member having a projecting arm serving to attach the spring means acting on the said chain tensioning lever.

10. A change speed chain gearing for bicycles and the like comprising a supporting arm fixed to the cycle; a cylinder adjustable at the end of said supporting arm, said cylinder having its axis parallel to the rear wheel axis; a piston slidable within said cylinder; controlling means for said piston; a rod fixed to said piston; a chain guide pinion carried by said rod; a chain tensioning lever also carried by said rod and having an arm bent to extend parallel to the periphery of said cylinder; spring means tending to rotate said chain tensioning lever to stretch the driving chain of the cycle; abutments in the form of cylindrical sectors adjustably fixed on the periphery of said cylinder, said sectors being disposed in mutual contact side by side and in staggered relation; and a detent fixed to said bent arm, said detent being in the form of a spring supported triangular tooth located in a plane axial with respect to the pivot of said tensioning lever and having its oblique edge directed towards the abutment which extends farthest in the direction of rotation of said chain tensioning lever corresponding to the action of said spring means, and said detent being arranged for selective cooperation with said abutments for each axial position of said guide pinion corresponding to each speed of said gearing to limit the action of said spring means on said chain tensioning lever.

JEAN MARCEL GRUYER.